United States Patent [19]

Frank

[11] 3,883,847

[45] May 13, 1975

[54] UNIFORM DECODING OF MINIMUM-REDUNDANCY CODES

[75] Inventor: Amalie Julianna Frank, Chatham Township, Morris County, N.J.

[73] Assignee: Bell Telephone Laboratories, Incorporated, Murray Hill, N.J.

[22] Filed: Mar. 28, 1974

[21] Appl. No.: 455,668

[52] U.S. Cl. .................... 340/146.1 R; 340/347 DD

[51] Int. Cl. ............................................ H03k 13/24

[58] Field of Search... 340/146.1 R, 347 DD, 172.5, 340/147 T

[56] References Cited

UNITED STATES PATENTS 3,331,056 7/1967 Lethon et al. .................. 340/172.5

3,496,550 2/1970 Schachner ....................... 340/172.5

3,810,154 5/1974 Briant .......................... 340/347 DD

*Primary Examiner*—Charles E. Atkinson

*Attorney, Agent, or Firm*—W. Ryan

[57] ABSTRACT

A high-speed decoding system and method for decoding minimum-redundancy Huffman codes, which features translation using stored tables rather than a tracing through tree structures. When speed is of utmost importance only a single table access is required; when required storage is to be minimized, one or two accesses are required.

9 Claims, 7 Drawing Figures

UNIFORM DECODING OF MINIMUM-REDUNDANCY CODES

BACKGROUND OF THE INVENTION

1. Field of the Invention

The present invention relates to apparatus and methods for decoding minimum-redundancy codes.

2. Background and Prior Art

With the increased use of digital computers and other digital storage and processing systems, the need to visually store and/or communicate digital information has become of considerable importance. Because information is in general associated with a number of symbols, such as alphanumeric symbols, and because some symbols in a typical alphabet occur with greater frequency than others, it has proven advantageous in reducing the average length of code words to use so-called statistical coding techniques to derive signals of appropriate length to represent the individual symbols. Such statistical coding is, of course, not new. In fact, the well-known Morse code for transmitting by telegraph may be considered to be of this type, where the relatively frequently occurring symbols (such as E) are represented by short signals, while less frequently occurring signals (such as Q) have correspondingly longer signal representations. Other variable length codes have been described in D. A. Huffman, "A Method for the Construction of Minimum-Redundancy Codes," Proc. of the IRE, Vol. 40, pp. 1098–1101, Sept. 1952; E. N. Gilbert and E. F. Moore, "Variable-Length Binary Encodings," Bell System Technical Journal, Vol. 38, pp. 933–967, July 1959; and J. B. Connell, "A Huffman-Shannon-Fano Code," Proc. IEEE, July 1973, pp. 1046–1047.

It will be noted from the above-cited references and from Fano, Transmission of Information, John Wiley and Sons, Inc., New York, 1961, pp. 75–81, that the Huffman encoding procedure may be likened to a tree generation process where codes corresponding to less frequently occurring symbols appear at the upper extremities of a tree having several levels, while those having relatively high probability occur at lower levels in the tree. While it may appear intuitively obvious that a decoding process should be readily implied by the Huffman encoding scheme, such has not been the common exerience. Many workers in the coding fields have found Huffman decoding quite intractable. See, for example, Bradley, "Data Compression for Image Storage and Transmission," Digest of Papers, IDEA Symposium, Society for Information Display, 1970; and O'-Neal, "The Use of Entropy Coding in Speech and Television Differential PCM Systems," AFOSR-TR-72-0795, distributed by the National Technical Information Service, Springfield, Va., 1971. In those cases where Huffman decoding has been accomplished, the complexity has been clearly recognized. See, for example, Ingels, Information and coding Theory, Intext Educational Publishers, Scranton, Pa., 1971, pp. 127–132; and Gallager, Information Theory and Reliable Communication, Wiley 1968.

When such Huffman decoding is required, it has usually been accomplished by a tree searching technique in accordance with a serially received bit stream. Thus by taking one of two branches at each node in a tree depending on which of two values is detected for individual digits in the received code, one ultimately arrives at an indication of the symbol represented by the serial code. This can be seen to be equivalent in a practical hardware implementation to the transferring to either of two locations from a given starting location for each bit of a binary input stream; the process is therefore a sequential one.

Such sequential "binary searches" are described, for example, in Price, "Table Lookup Techniques," Computing Surveys Vol. 3, No. 2, June 1971, pp. 49–65.

Similar tree searching operations are described in U.S. Pat. No. 3,700,819 issued Oct. 24, 1972 to M. J. Marcus; E. H. Sussenguth, Jr., "Use of Tree Structures for Processing Files," Comm. ACM 6, 5, May 1963, pp. 272–279; and H. A. Clampett, Jr., "Randomized Binary Searching with Tree Structures," Comm. ACM 7, 3 March 1964, pp. 163–165.

It is therefore an object of the present invention to provide a decoding arrangement for information coded in the form of mimimum-redundancy Huffman codes without requiring sequential or bit-by-bit decoding operations.

As noted above tree techniques are equivalent to transferring sequentially from location to location in a memory for each received bit to arrive at a final location containing information used to decode a particular bit sequence. Such sequential transfers from position to position in a memory structure is wasteful of time, and in some cases, effectively precludes the use of minimum-redundancy codes. Further, considerable variability in decoding time will be experienced when code words of widely varying lengths are processed. Such variability reduces the likelihood of use in applications such as display systems, where presentation of output symbols at a constant rate is often desirable.

It is therefore a further object of the present invention to provide apparatus and methods for providing for the parallel or nearly parallel decoding of variable-length minimum-redundancy codes.

While the use of table look-up proceduces, is well known in decoding operations, such operations often require the utilization of an excessively large memory structure.

Accordingly, it is a still further object of the present invention, in one embodiment, to provide for the efficient table decoding of minimum-redundancy codes utilizing a reduced amount of memory.

SUMMARY OF THE INVENTION

In a typical embodiment, the present invention provides for the accessing of a fixed-length sample of an input bit stream consisting of butted-together variable-length codewords. Each of these samples is used to derive an address defining a location in a memory where an indication of the decoded output symbol is stored along with an indication of the actual length of the codeword corresponding to the output symbol. Since the fixed-length sample is chosen to be equal in length to the maximum codeword length, the actual codeword length information is used to define the beginning point for the next following codeword in the input sequence.

When it is desired that storage memory usage be minimized, an alternative embodiment provides for a memory hierarchy including a primary table and a plurality of secondary tables. Once again a fixed length sample is used, but the length, K, is chosen to be less than that of the maximum codeword. When the sample includes a codeword of length less than or equal to K, decoding proceeds as in the first (one table) embodiment. That is, only the primary table need be used. When the sample is not large enough to include all of the bits in a codeword, however, resort is had to a number of succeeding bits in the input bit stream (such number being indicated in the accessed location of the primary table) to generate in combination with other data stored in the accessed location in the primary table, an address adequate to identify a location in a secondary table containing the decoded symbol. This latter location also contains the value of the actual code length as reduced by K, which is used to define the beginning point for the next codeword.

Because of the uniform nature of the operations involved, the present invention lends itself to both special purpose and programmed general purpose machine implementations, both of which are disclosed.

DETAILED DESCRIPTION

Figure 1:
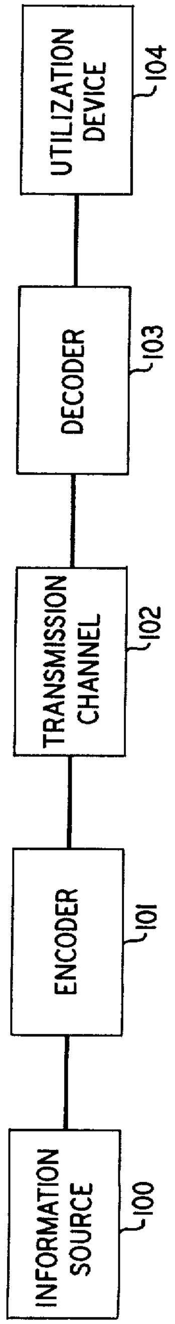
FIG. 1 shows an overall communication system including a decoder function to be supplied in accordance with the present invention.

FIG. 1 shows the overall arrangement of a typical communication system of the type in which the present invention may be employed. Information source 100 originates messages to be communicated to a utilization device 104 after processing by the encoder 101, transmission channel 102, and decoder 103. Information source 100 may, of course, assume a variety of forms including programmed data processing apparatus, or simple keyboard or other information generating devices. Encoder 101 may also assume a variety of forms and for present purposes need only be considered to be capable of translating the input information, in whatever form supplied by source 100, into codes in the Huffman format. Similarly, transmission channel 102 may be either a simple wire or other communication channel of standard design, or may include a further processing such as message store and forward facilities. Channel 102 may include signalling and other related devices. For present purposes, however, it need only be assumed that transmission channel 102 delivers to decoder 103 a serial bit stream containing butted variable length code words in the Huffman minimum-redundancy format. It is the function of decoder 103, then, to derive from this input bit stream the original message supplied by information source 100.

Utilization device 104 may assume a number of standard forms, such as a data processing system, a display device, or photocomposition system. A typical system utilizing Huffman codes in a graphics encoding context is described in my copending U.S. Pat. application Ser. No. 425,506, filed Dec. 17, 1973.

The minimum-redundancy code set supplied to decoder 103 consists generally of a finite number of codewords of various lengths. For present purposes, it will be assumed that each codeword comprises a sequence of one or more binary digits, although other than binary signals may be employed in some contexts. Such a code set may be characterized by a set of decimal numbers $I_1, I_2, \ldots, I_M$, where $I_j$ is the number of codewords j bits long, and M is the maximum codeword length. We denote this structure by an index, I, which is a concatenation of the decimal numbers $I_j$, i.e., $I = I_1I_2 \ldots I_M$. For example, a source with three types of messages with probabilities 0.6, 0.3, and 0.1, results in a minimum-redundancy code set consisting of 1 code 1 bit long, and 2 codes, each 2 bits long, yielding the index I = 12. Numerous realizations of a code with a particular index are possible. One such realization for I = 12 consists of the codewords 1 and 00 and 01; another realization is 0 and 10 and 11. As a further example, Table I shows a code with an index I = 1011496, based on one appearing in B. Rudner, "Construction of Minimum-Redundancy Codes With an Optimum Synchronizing Property," IEEE Transactions on Information Theory, Vol. IT-17, No. 4, pp. 478–487, July, 1971. Shown also in Table I are the length of the codewords and the associated decoded values, in this case alphabetic characters.

TABLE I

CODE WITH I = 1011496

| Codeword | Codeword Length | Decoded Value |
|---|---|---|
| 0 | 1 | A |
| 100 | 3 | B |
| 1100 | 4 | C |
| 10100 | 5 | D |
| 11010 | 5 | E |
| 11100 | 5 | F |
| 11110 | 5 | G |
| 101010 | 6 | H |
| 101100 | 6 | I |
| 101110 | 6 | J |
| 101111 | 6 | K |
| 110110 | 6 | L |
| 110111 | 6 | M |
| 111010 | 6 | N |
| 111110 | 6 | O |
| 111111 | 6 | P |
| 1010110 | 7 | Q |
| 1010111 | 7 | R |
| 1011010 | 7 | S |
| 1011011 | 7 | T |
| 1110110 | 7 | U |
| 1110111 | 7 | V |

The code given above in Table I may be decoded using straightforward table-look-up techniques only if some function of each of the individual codes can be generated which specifies corresponding table addresses. The identification of such a function is, of course, complicated by the variable code word lengths.

A technique in accordance with one aspect of the present invention will now be described for constructing and utilizing a particularly useful translation table for the code of Table I.

It proves convenient in forming such a translation table to first construct a table of equivalent code words with equal length. In particular, for each codeword of length less than M in Table I a new codeword is derived with length equal to M. These new codewords are generated by attaching zeroes to the right, i.e., adding trailing zeroes. Table II shows the derived codewords in binary and in decimal form.

TABLE II

| DERIVED CODE WORDS Binary | Decimal |
|---|---|
| 0000000 | 0 |
| 1000000 | 64 |
| 1100000 | 96 |
| 1010000 | 80 |
| 1101000 | 104 |
| 1110000 | 112 |
| 1111000 | 120 |
| 1010100 | 84 |
| 1011000 | 88 |
| 1011100 | 92 |
| 1011110 | 94 |
| 1101100 | 108 |
| 1101110 | 110 |
| 1110100 | 116 |
| 1111100 | 124 |
| 1111110 | 126 |
| 1010110 | 86 |
| 1010111 | 87 |
| 1011010 | 90 |
| 1011011 | 91 |
| 1110110 | 118 |
| 1110111 | 119 |

It will now be shown that the codewords in Table II can be used to directly access memory locations containing a decoding table. In particular, each of the codewords is interpreted as an address which, when incremented by 1, provides the required address in a translation table containing $2^M$ entries.

Each entry in the translation table contains the associated original codeword length and the decoded value in appropriate fields. Thus, for example, the 1st table entry contains the codeword length 1 and the codeword value A, and the 65th table entry contains the codeword lengths 3 and the decoded value B. There are $$\sum_{N=1}^{M} I_N$$

such entries. After all such entries have been made, each empty entry in the table has copied into it the entry just prior to it. Thus, for example, the codeword length 1 and decoded value A are copied successively into table entries 2 through 64. The completed translation table is shown in Table III

TABLE III

| TRANSLATION TABLE FOR CODE IN TABLE I Address or Address Range | Contents |
|---|---|
| 1 - 64 | 1, A |
| 65 - 80 | 3, B |
| 81 - 84 | 5, D |
| 85 - 86 | 6, H |
| 87 | 7, Q |
| 88 | 7, R |
| 89 - 90 | 6, I |
| 91 | 7, S |
| 92 | 7, T |
| 93 - 94 | 6, J |
| 95 - 96 | 6, K |
| 97 - 104 | 4, C |
| 105 - 108 | 5, E |
| 109 - 110 | 6, L |
| 111 - 112 | 6, M |
| 113 - 116 | 5, F |
| 117 - 118 | 6, N |
| 119 | 7, U |

TABLE III-Continued

| TRANSLATION TABLE FOR CODE IN TABLE I Address or Address Range | Contents |
|---|---|
| 120 | 7, V |
| 121 - 124 | 5, G |
| 125 - 126 | 6, O |
| 127 - 128 | 6, P |

The decoding of an input stream using Tables II and III will now be described. A pointer to the current position in the bit stream is established, beginning with the first position. Starting at the pointer a fixed segment of M bits is retrieved from the input bit stream. At this time the pointer is not advanced, i.e., it still points to the start of the segment. The number represented by the M bits retrieved is incremented by 1, yielding some value, W. Using W as an address, the $W^{th}$ entry is retrieved from the translation table, thereby giving the codeword length and the decoded value. The decoded value is transferred to the utilization device 104 and the bit stream pointer advanced by an amount equal to the retrieved codeword length. This process is then repeated for the next segment of M bits.

In essence, the constant retrieval of M bits from the bit stream converts the variable length code into a fixed length code for processing purposes. Each segment consists either of the entire codeword itself, if the codeword is M bits long, or of the codeword plus some terminal bits. In decoding such a codeword, the terminal bits have no effect because the translation table contains copies of the codeword length and decoded value for all possible values of the terminal bits. The terminal bits belong, of course, to one or more subsequent codewords, which are processed in proper order as the bit stream pointer is advanced. The above process is thus seen to be a simple technique for fast decoding of variable length codes, with uniform decoding time per code.

As an example, the decoding of the beginning of the message THEQUICKSLYFOX, as represented by the codes in Table I, in connection with the apparatus of FIG. 2 will be described. The bit sequence for this message, with time increasing to the left, and with each character presented most-significant-bit-first (rightmost), is:

111101001100110101101110110101010110101011101101 •

K C I U Q E H T

Spaces have, of course, been omitted to permit the use of the codes in Table I.

Figure 2:
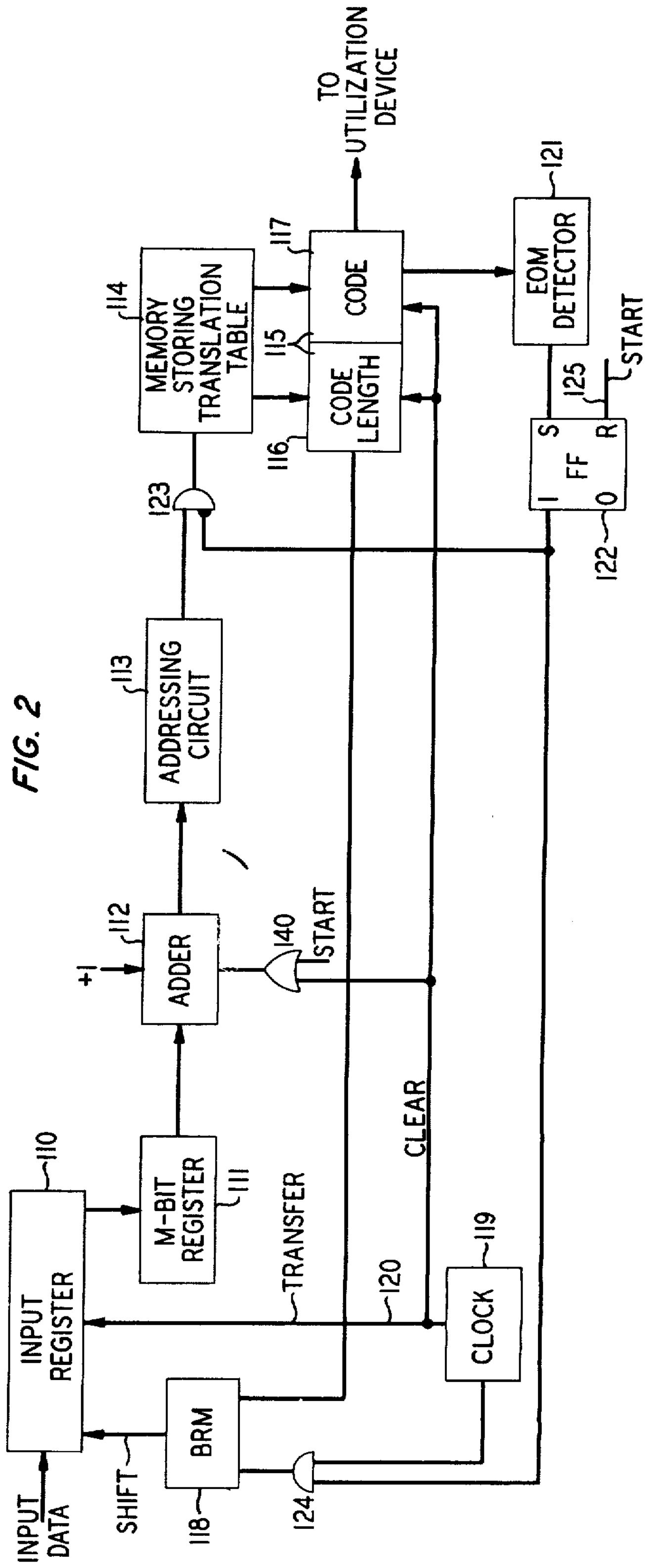
FIG. 2 is a block diagram representation of a onetable embodiment of the present invention.

The circuit of FIG. 2 is illustrative of the apparatus which may be used to practice the above-described aspect of the present invention. Thus, the above-presented bit stream is applied in serial form to input register 110. It should be clear that the input pattern may also be entered in parallel in appropriate cases. When the message contains more bits than can be stored in register 110, standard, buffering techniques may be used to temporarily store some of these bits until register 110 can accommodate them.

Once register 110 has been loaded, i.e., the first bits have appeared at the right of register 110, M-bit register 111 advantageously receives the most significant (rightmost) M bits by transfer from register 110. These M bits are then applied to adder 112 which forms the sum of the M bits (considered as a number) and the constant value 1. In simplified form, adder 112 may be a simple M-bit counter, and the +1 signal may be an incrementing pulse. The output of adder 112 is then applied to addressing circuit 113 which then selects a word from memory 114 based on this output. Addressing circuit 113 and memory 114 may, taken together, assume the form of any standard random access memory system having an associated addressing circuit. Although single line connections are shown in FIG. 2, and the sequel, it will be understood from context that some signal paths are multiple bit paths. For example, the path entering adder 212 is a K-bit path, i.e., in general K wire connections.

The addressed word is read into register 115 which is seen to have 2 parts. The rightmost portion of register 115 receives the decoded character and is designated 117 in FIG. 2. This decoded character is then supplied to utilization circuit 104 in standard fashion. As stored in memory 114 the character will be coded in binary coded decimal form or whatever "expanded" form is required by utilization circuit 104. Particular codes for driving a printer are typical when the alphabetic symbols of Table I are to be utilized. The decoding of that character is complete.

The left portion 116 of register 115 receives the signals indicating the number of bits used in the input bit stream to represent the decoded character. This number is then used to shift the contents of the register 110 by a corresponding number of bits to the right. Any source of shift signals, such as a binary rate multiplier (BRM) 118 may be used to effect the desired shift. Thus is typical practice a fixed sequence of clock signals from clock 119 will be "edited" by the BRM to achieve the desired shift. Upon completion of shifting (conveniently indicated by a pulse on lead 120 defining the termination of the clock pulse sequence) a new M-bit sequence is transferred to register 111. This transfer pulse is also conveniently used to clear adder 112 and register 115. The above sequence is then repeated.

When a special character defining the end of a message (EOM) is decoded, the EOM detector 121 (a simple AND gate or the equivalent) sets flip-flop 122. This has the effect of applying an inhibit signal to AND gates 123 and 124, thereby preventing the accessing of memory 114 and the shifting of the contents of register 110. When a new message is about to arrive, as independently signalled on START lead 125, flip-flop 122 is reset, adder 112 cleared by way of OR gate 149, and the new message processed as before.

Returning to the sample message given above, we see that the first M-bit sequence 1101101 (or 1011011 = 91 (decimal) in normal order) transferred to register 111 results, as indicated in Table III, in the accessing of memory location 91+1=92. Location 92 is seen in Table III to contain the information 7, T, i.e., the decoded character is T and its length as represented in the input sequence is 7 bits. Thus T is delivered to the utilization circuit 104 and BRM 118 generates 7 shift pulses. The transfer signal on lead 120 then causes the next 7 bits 1010101 (or 1010101 = 85 (decimal)) to be transferred to register 111. The transfer signal also conveniently clears adder 112 and register 115 to prevent the previous contents from generating an erroneous result. A small delay can be inserted between register 111 and adder 112 if a race condition would otherwise result. The accessing of memory location 86 = 85 + 1 then causes register 115 to receive the information 6, H. BRM 118 then advances the shift register 110 by 6 bits. Table IV completes the processing of the exemplary sequence given above.

TABLE IV

| 7-bit Sequence | Address Accessed | Decoded Bit/No. Shifts |
|---|---|---|
| 1011011 | 92 | T, 7 |
| 1010101 | 86 | H, 6 |
| 1101010 | 107 | E, 5 |
| 1010110 | 87 | Q, 7 |
| 1110110 | 119 | U, 7 |
| 1011001 | 90 | I, 6 |
| 1100101 | 102 | C, 4 |
| 1011111 | 96 | K, 6 |

When it is desired to reduce the total required table storage, a somewhat different sequence of operations may be utilized to advantage, as will now be disclosed. As noted above, for any given index $I = I_1 I_2 \ldots I_M$, many realizations of a minimum-redundancy code are possible. The code cited above for I = 1011496 has a particular synchronization property described in the above-cited paper by Rudner. Another realization is a monotonic code, in which the code values are ordered numerically. Such an increasing monotonic code is constructed by selecting the first codeword to consist of $I_1$ zeroes. Every other codeword is formed by adding 1 to the preceding codeword and then multiplying by $2^{L-L}$, where $L_i$ and $L_{i-1}$ are the codeword, respectively. L monotonic code with the same index as that for the code of FIG. 1, I = 1011496, is exhibited in Table V.

TABLE V

MONOTONIC CODE WITH I = 1011496

| Codeword | Codeword Length | Decoded Value |
|---|---|---|
| 0 | 1 | A |
| 100 | 3 | B |
| 1010 | 4 | C |
| 10110 | 5 | D |
| 10111 | 5 | E |
| 11000 | 5 | F |
| 11001 | 5 | G |
| 110100 | 6 | H |
| 110101 | 6 | I |
| 110110 | 6 | J |
| 110111 | 6 | K |
| 111000 | 6 | L |
| 111001 | 6 | M |
| 111010 | 6 | N |
| 111011 | 6 | O |
| 111100 | 6 | P |
| 1111010 | 7 | Q |
| 1111011 | 7 | R |
| 1111100 | 7 | S |
| 1111101 | 7 | T |
| 1111110 | 7 | U |
| 1111111 | 7 | V |

Codes of the form shown in Table V have been used by the present inventor in image encoding as described in A. J. Frank, "High Fidelity Encoding of Two-Level, High Resolution Images," Proc. IEEE International Conference on Communications, Session 26, pp. 5-10, June 1973; and by others as described, for example, in the above-cited Connell paper. For purposes of simplification, the discussion below will be restricted to the technique for minimizing translation table storage for monotonic codes. It is noted, however, that the technique is applicable to any minimumredundancy code, although, for any given index I, a monotonic code generally yields the lowest minimum table storage.

The technique described above in connection with the system of FIG. 2 minimizes decoding time, by requiring only a single memory access for each codeword. A segment of M bits is retrieved each time the bit stream is accessed. The effect of retrieving a segment of K bits, where K is less than M will now be discussed. To illustrate, consider K = 4. First, a "primary" translation table is built from the codewords of Table V in a manner similar to that described previously, but here the derived codewords are all exactly 4 bits long. This generally means that some of the codewords of Table I are extended by attaching zeroes to the right, and some are truncated, as shown in Table VI.

TABLE VI

DERIVED CODEWORDS FOR MONOTONIC CODE

| Binary | Decimal |
|---|---|
| 0000 | 0 |
| 1000 | 8 |
| 1010 | 10 |
| 1011 | 11 |
| 1011 | 11 |
| 1100 | 12 |
| 1100 | 12 |
| 1101 | 13 |
| 1101 | 13 |
| 1101 | 13 |
| 1101 | 13 |
| 1110 | 14 |
| 1110 | 14 |
| 1110 | 14 |
| 1110 | 14 |
| 1111 | 15 |
| 1111 | 15 |
| 1111 | 15 |
| 1111 | 15 |
| 1111 | 15 |
| 1111 | 15 |
| 1111 | 15 |

Codewords with length greater than K in Table V result in derived codewords which are identical. This occurs whenever the first K bits of a group of codewords are alike. For example, the derived codewords corresponding to D and E are the same because the first 4 bits of the original codewords in Table V are the same. Any such multiplicity is resolved by retrieving additional bits from the bit stream and using these additional bits to direct, in part, the accessing of at most one additional "secondary" translation table. The primary table entry for each of the codes having the first K = 4 bits which are the same as another code contains the number of additional bits to retrieve from the bit stream, and an address to the required secondary table. Before retrieving the additional bits, the bit stream pointer is advanced K positions. The number of additional bits to retrieve is equal to A, where $2^A$ is the size of the secondary table addressed. The additional bits retrieved, considered as a number, when incremented by 1 form an index into the indicated secondary table. The identified word in the indicated secondary table contains the codeword length minus K, and the decoded value. As in the previous case, the appropriate decoded value is delivered to the utilization device, the bit stream pointer is advanced (here by an amount equal to the codeword length minus K), and the process is repeated for the next segment. Table VII shows the primary and secondary translation tables required for the monotonic code indicated in Table V for K = 4. Note that a secondary table may encompass codewords of varying length, as illustrated by secondary table 2.5.

TABLE VII

TRANSLATION TABLES FOR CODE IN TABLE V

PRIMARY TABLE

| Address or Address Range | Contents |
|---|---|
| 1 - 8 | 1, A |
| 9 - 10 | 3, B |
| 11 | 4, C |
| 12 | 1, Table 2.1 |
| 13 | 1, Table 2.2 |
| 14 | 2, Table 2.3 |
| 15 | 2, Table 2.4 |
| 16 | 3, Table 2.5 |

SECONDARY TABLE 2.1

| Address | Contents |
|---|---|
| 1 | 1, D |
| 2 | 1, E |

SECONDARY TABLE 2.2

| Address | Contents |
|---|---|
| 1 | 1, F |
| 2 | 1, G |

SECONDARY TABLE 2.3

| Address | Contents |
|---|---|
| 1 | 2, H |
| 2 | 2, I |
| 3 | 2, J |
| 4 | 2, K |

SECONDARY TABLE 2.4

| Address | Contents |
|---|---|
| 1 | 2, L |
| 2 | 2, M |
| 3 | 2, N |
| 4 | 2, O |

SECONDARY TABLE 2.5

| Address | Contents |
|---|---|
| 1 | 2, P |
| 2 | 2, P |
| 3 | 3, Q |
| 4 | 3, R |
| 5 | 3, S |
| 6 | 3, T |
| 7 | 3, U |
| 8 | 3, V |

To determine the number and sizes of the secondary tables, it is convenient to proceed as follows. Starting with the smallest size of 2 entries, the number of such tables required is the number of times 2 divides $I_{K+1}$ integrally, or symbolically, $INT(I_{K+1}/2)$. Where 2 does not divide $I_{K+1}$ evenly, the remaining codeword, $I_{K+1}$ MOD 2, is grouped with some table of larger size. Proceeding to the table of next size, $2^2$, the number of such tables is the number of times $2^2$ integrally divides the sum $I_{K+2}$ and the remainder after forming the lower sized tables, $INT(I_{K+2}+(I_{K+1})MOD\ 2)/2^2)$. The accumulated number of remaining codewords is now $(I_{K+2}+(I_{K+1})MOD\ 2)MOD\ 2^2$. In general, the number of tables of size $2^J$ entries is:

$$INT((I_{K+J}+(I_{K+J-1}+(I_{K+J-2}+\ldots +(I_{K+2}+(I_{K+1})MOD\ 2)MOD\ 2^2)\ldots)MOD\ 2^{J-1})/2^J)$$

The process of determining the number of tables of the next larger size, and the accumulated remaining codewords is continued until the tables of largest size, $2^{M-K}$ is reached. For the largest size tables the above expression is modified to establish an additional table if there are any remaining codewords. To do this, we add $2^{M-K}-1$ to the numerator of the expression above. To determine which K yields the minimum total translation table storage, the total storage as a function of K is determined, and then the function is minimized. The total translation table storage is the sum of the products of each table size and the number of tables of that size. For the example cited, where K = 4, the primary table requires $2^K$ or 16 entries and, of the secondary tables, 2 require 2 entries each, 2 require $2^2$ entries each, and 1 requires $2^3$ entries, yielding a total of 36 entries. For K = 7, the primary table alone of $2^7$ or 128 entries is required. In general, the total storage, N is $$N = 2^K + \sum_{J=1}^{M-K-1} (2^J)\,\mathrm{INT}((I_{K+J}+(I_{K+J-1}+(I_{K+J-2}+\ldots +(I_{K+2}+(I_{K+1})\,\mathrm{MOD}\ 2)\,\mathrm{MOD}\ 2^2)\ldots)\,\mathrm{MOD}\ 2^{J-1})/2^J) + (2^{M-K})\,\mathrm{INT}\ ((I_M+(I_{M-1}+(I_{M-2}+\ldots +(I_{K+2}+(I_{K+1})\,\mathrm{MOD}\ 2)\,\mathrm{MOD}\ 2^2)\ldots)\,\mathrm{MOD}\ 2^{M-K-1}+2^{M-K}-1)/2^{M-K})$$

which may be shown to be reducible to:

$$N = 2^K + 2^{M-K} - 1 + \sum_{J=1}^{M-K} I_{K+J} - (I_M+((I_{M-1}+(I_{M-2}+\ldots +(I_{K+2}+(I_{K+1})\,\mathrm{MOD}\ 2)\,\mathrm{MOD}\ 2^2)\ldots)\,\mathrm{MOD}\ 2^{M-K-1}) + 2^{M-K}-1)\,\mathrm{MOD}\ 2^{M-K}$$

For any given index I, we may now determine the minimum storage by calculating N for all values of K. We may also obtain a good estimate for the minimum by noting that for M sufficiently large, the sum of the first two terms in the formula above accounts for the major part of N. The first two terms $2^K + 2^{M-K}$ is minimum for K = M/2.

We may reduce storage requirements even further by segmenting the maximum codeword into more than two parts, and establishing tertiary and higher ordered tables. However, this would also increase the average number of table accesses per codeword. For speed of processing, limiting the maximum number of accesses to two proves convenient.

Table VIII summarizes the results for the monotonic code with I = 1011496. For each of the seven possible K values, Table VIII shows the sum of $2^K + 2^{M-K}$, the storage required for the translation tables, the number of codewords requiring one tables access, and the number requiring two table accesses.

TABLE VIII

TRANSLATION TABLES STORAGE AND NUMBER OF TABLE ACCESSES FOR CODE IN TABLE IV

| K | $2^K+2^{M-K}$ | Translation Tables Storage | No. of codewords by no. of accesses 1 | 2 |
|---|---|---|---|---|
| 1 | 65 | $66 = 2 + (1)(2^6)$ | 1 | 21 |
| 2 | 35 | $36 = 2^2 + (1)(2^5)$ | 1 | 21 |
| 3 | 23 | $36 = 2^3 + (1)(2^2) + (1)(2^3) + (1)(2^4)$ | 2 | 20 |
| 4 | 23 | $36 = 2^4 + (2)(2\ ) + (2)(2^2) + (1)(2^3)$ | 3 | 19 |
| 5 | 35 | $48 = 2^5 + (4)(2\ ) + (2)(2^2)$ | 7 | 15 |
| 6 | 65 | $70 = 2^6 + (3)(2)$ | 16 | 6 |
| 7 | 128 | $128 = 2^7$ | 22 | 0 |

The table storage is shown in total, as well as the amount required for each separate table. Thus, for K = 1, the total storage is 66 table entries, comprising a primary table of size 2, and 1 secondary table of size $2^6$.

It can be seen that even for M = 7, which is relatively small, the sum $2^K + 2^{M-K}$ accounts for a large part of the total storage. For this example, the estimated minimum occurs at K = M/2 = 3.5. The exact minimum actually occurs for three values of K, namely 2, 3, and 4. In this case the largest K would be chosen for implementation because it results in the largest number of codewords which require only one access to the translation tables.

In the example shown in Table VII, use of secondary translation tables effects a compression of 36/128 = 0.28. Considerably better compressions obtain where M is larger. For example, a useful practical example, shown in Table IX, is one which constitutes the code with index I = 0028471104; a minimum-redundancy code for the letters of the English alphabet and space symbol. Applying the formulae above, an estimated and actual minimum at K = 5 is obtained. The minimum storage for the translation tables for the code of Table IX is 70. Such a translation table comprises a primary table of 32 entries, three secondary tables of two entries each, and one secondary table with 32 entries. The compression coefficient in this case is 70/1024 = 0.07.

TABLE IX

HUFFMAN CODES FOR LETTERS OF ENGLISH ALPHABET AND SPACE

| Decoded Value | Codeword |
|---|---|
| Space | 000 |
| E | 001 |
| A | 0100 |
| H | 0101 |
| I | 0110 |
| N | 0111 |
| O | 1000 |
| R | 1001 |
| S | 1010 |

TABLE IX-Continued

HUFFMAN CODES FOR LETTERS OF ENGLISH ALPHABET AND SPACE

| Decoded Value | Codeword |
|---|---|
| T | 1011 |
| C | 11000 |
| D | 11001 |
| L | 11010 |
| U | 11011 |
| B | 111000 |
| F | 111001 |
| G | 111010 |
| M | 111011 |
| P | 111100 |
| W | 111101 |
| Y | 111110 |
| V | 1111110 |
| K | 11111110 |
| J | 1111111100 |
| Q | 1111111101 |
| X | 1111111110 |
| Z | 1111111111 |

Figure 3:
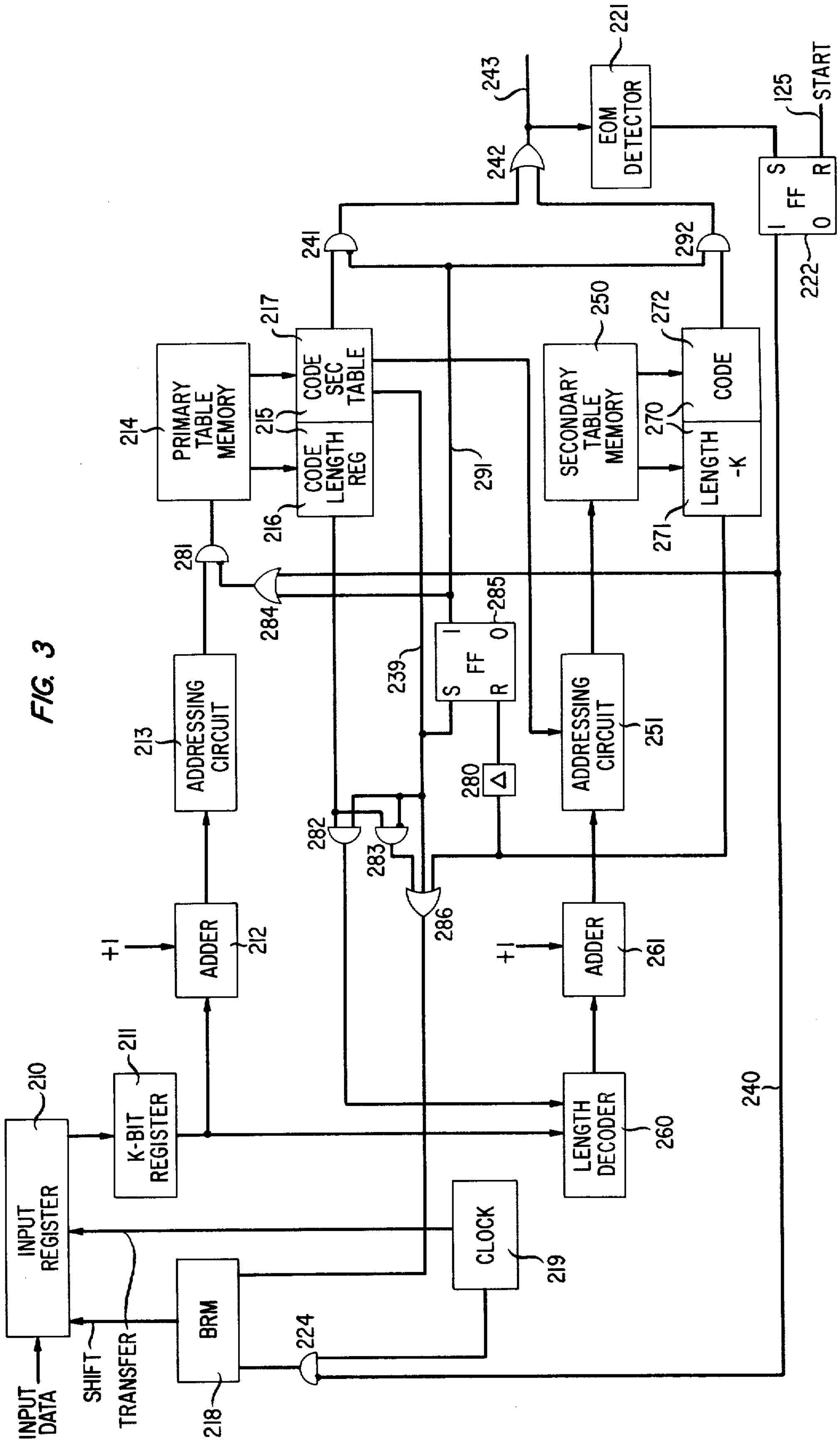
FIG. 3 is a block diagram representation of an embodiment of the present invention employing a primary translation table and a plurality of secondary translation tables.

FIG. 3 shows a typical system for performing the above-described steps for accessing the primary and secondary translation tables. Input bits are entered moist-significant-bit-first either in serial or parallel into shift register 210. Again the buffering considerations mentioned above in connection with the circuit of FIG. 2 apply.

When the bits are completely entered (most significant bit of the first codeword positioned at the extreme right of register 210 in FIG. 3), the first K bits are transferred in parallel to K-bit register 211. As was the case for the circuit of FIG. 2, this transferred sequence is incremented by 1 in adder 212 and used as an address by addressing circuit 213 to address the primary translation table stored in memory 214. For convenience, the input codewords will be assumed to be those in Table V, with the result that the primary translation table in Table VII obtains.

Thus if a K-bit sequence of the form 0000 is incremented by 1, resulting in an address of 0001=1, memory location 1 is accessed. The read out contents (1,A) of location 1 is delivered to a register 215 having a left section 216 and a right section 217. The 1 from location 1, indicating the length of the current codeword, is entered into register portion 216, and the A entered into register 217. The contents of register 217 are then delivered by way of AND 241 and OR gate 242 to lead 243 and thence to utilization device 104. When the special EOM character appears on output lead 243, EOM detector 221 causes flip-flop 222 to be set. Since the decoding of the current codeword is complete, the contents of register 216 are used to advance the data in register 210 by 1 bit by operating on BRM 218 by way of AND gate 283 and OR gate 286. BRM 218 is also responsive to a burst of K clock signals from clock circuit 219 unless an inhibit signal is applied to lead 240 by EOM flip-flop 222.

The above sequence including the transferring of a K-bit byte, incrementing by 1, accessing of memory 214 with the resulting address, readout of decoded values and code length proceeds without more whenever one of the locations 1 through 11 of memory 214 (the primary translation table memory) is addressed. When, however, one of locations 12 through 16 of memory 214 is accessed, a further memory access to one of the secondary tables stored in memory 250 is required. The secondary table identification pattern stored in the primary table typically includes an additional non-address bit which, when detected on lead 237, causes BRM 218 to shift the contents of register 210 by K-bits to the right.

As noted above and in Table VII, locations in the primary table which contain secondary-table-idenfification information (including locations 12–16 in memory 214) specify the appropriate secondary table and the number of additional bits to retrieve from the input bit stream. The number of additional bits to retrieve is A, where $2^A$ is the size or number of entries in the secondary table addressed. For example, for the codeword for P in Table V, and K=4, the address location 16 in the primary table gives 3 as the number of additional bits to retrieve because the associated secondary table 2.5 is of size $2^3 = 8$. To identify the correct location in the identified secondary memory, secondary memory access circuit 251 interprets the contents of register 217 and the above-mentioned A additional bits derived from the input bit stream. These additional A bits, in turn, are derived by way of register 211, decoder 260 and adder 261. Decoder 260 may be a simple masking circuit responsive to the contents of register 216 to eliminate any undesired bits. In the case of an input code for P from Table V, and upon accessing location 16 based on the first K = 4 (1111 = 15 decimal), as incremented by 1, an additional 3 bits are specified for extraction from the input bit stream.

Access circuit 251 then identifies the appropriate location in secondary table memory 250. The contents of this location are entered into output register 270, the codeword length reduced by K being entered into the left portion 271 and the decoded word into the right portion 272. Once again, OR gate 242 passes the decoded word to output lead 243 and thence to utilization device 104.

To prevent the inadvertant passing of a secondary table partial address stored in register 217 to output lead 243, AND gate 241 is inhibited by a signal on lead 291 whenever flip-flop 285 is set. Flip-flop 285, in turn, is responsive to the detection of the signal on lead 239 indicating that a secondary table access is required. The same signal on lead 291 is used to enable AND gate 292 to permit the contents of register 272 to be delivered to output lead 243.

The signal on lead 239 is also used to prevent the contents of register 216 from being applied to BRM 218. This is accomplished by the inhibit input on AND gate 283. It should be recalled that an entire new K-bit sequence is operated on to retrieve the additional A bits required to identify a location in the appropriate secondary table. Thus the signal on lead 239 instead selectively enables the length decoder 260 by way of AND gate 282 to derive the required A-bit sequence. Further access to memory 214 while the secondary tables are being accessed is prevented by the output from flip-flop 285 as applied by way of OR gate 284 to the inhibit input to AND gate 281.

The length-indicating contents of register 271, while primarily indicating the number of pulses to be delivered by BRM 218 to shift register 210, is also used, in derived form, after an appropriate delay supplied by delay unit 280, to reset flip-flop 285. A simple ORing of the output bits from register 271 is sufficient for this purpose.

While the above embodiments of the present invention have been in the form of special purpose digital circuitry, it will be clear to those skilled in the relevant arts that the decoding of Huffman codes by programmed digital computer will be desirable in some cases. In fact, the essentially sequential bit-by-bit decoding used in prior art applications of Huffman coding is suggestive of such programmed computer implementations. See, for example, F. M. Ingels, Information and Coding Theory, Intext Educational Publisher, Scranton, Pa., 1971, pp. 127–132, which describes Huffman codes and includes a FORTRAN program for decoding such codes.

Figures 4A, 4D:
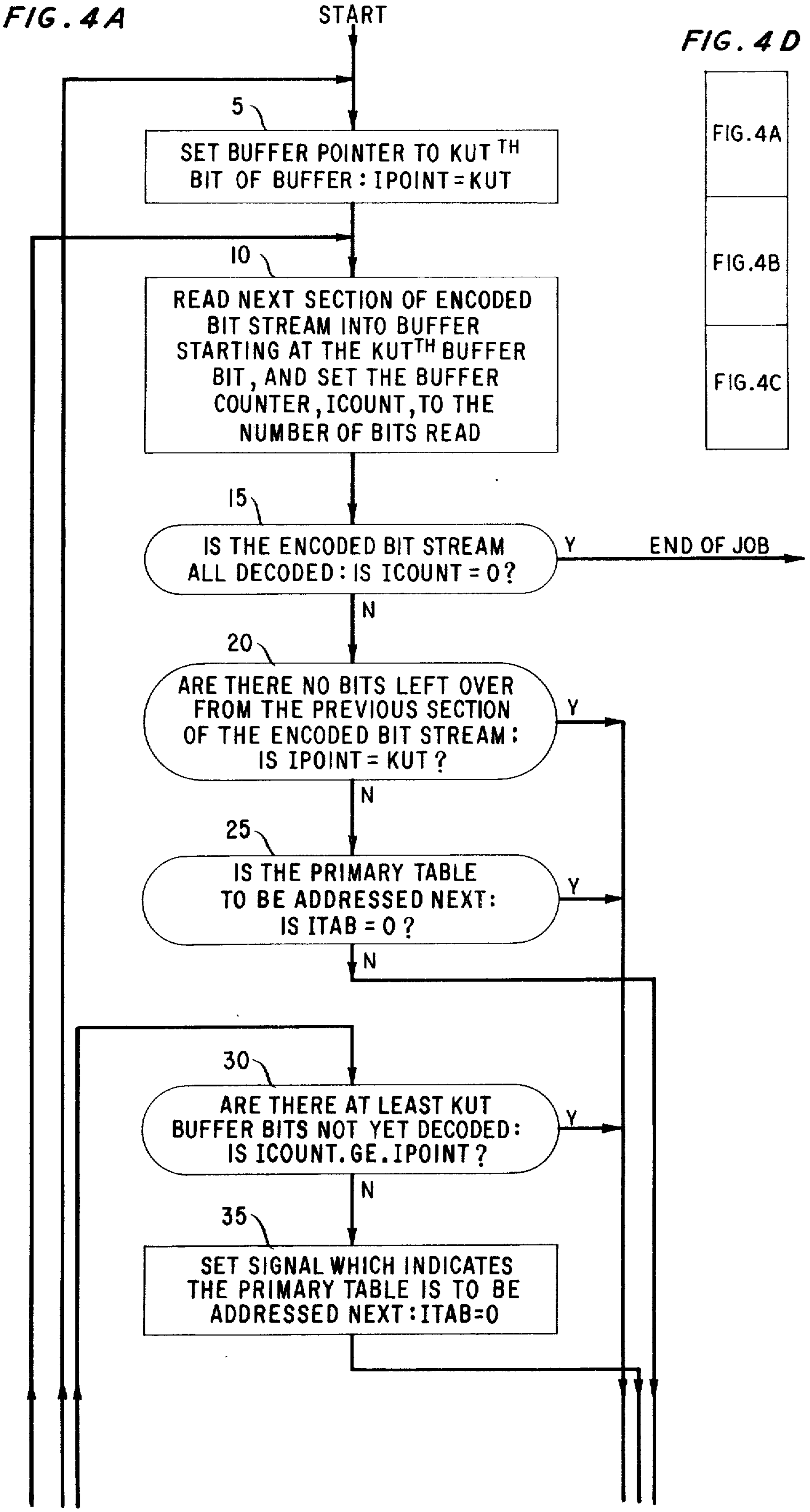
FIGS. 4A–C, taken together, comprise a flowchart representation of a program for realizing a programmed general purpose computer embodiment of the present invention.
FIG. 4D illustrates the manner of interconnecting FIGS. 4A–C.
Figure 4B:
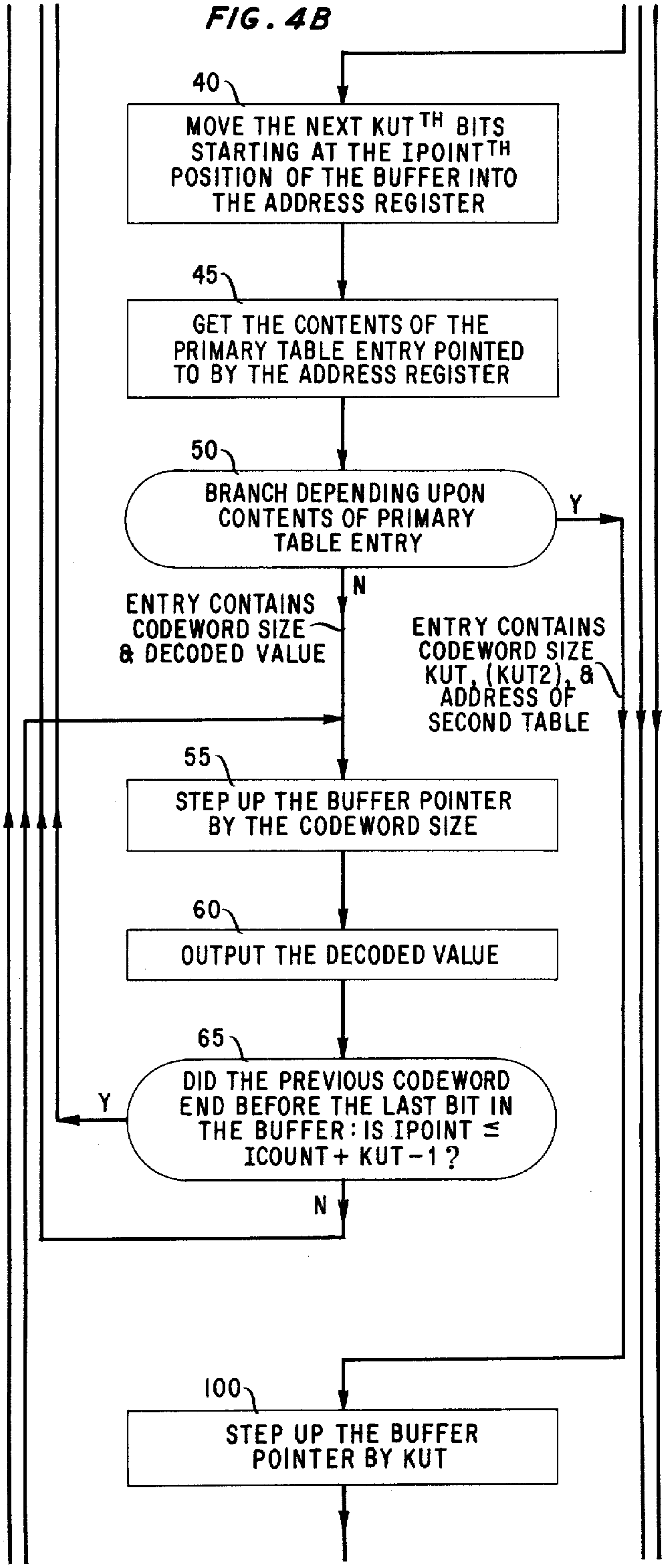
Figure 4C:
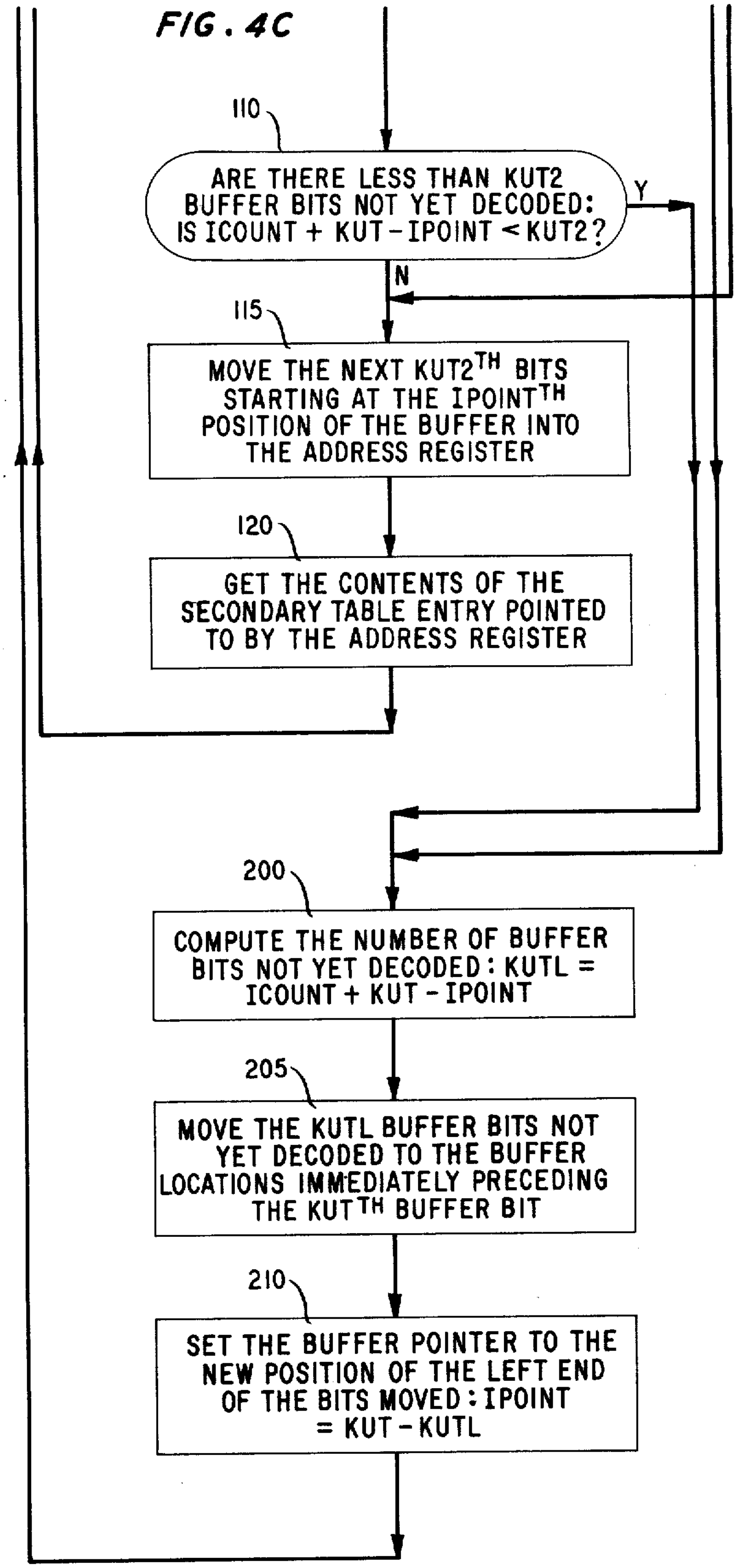

Listings 1 and 2 represent an improved program in accordance with another aspect of the present invention for the decoding of Huffman codes. The techniques used are enumerated in detail in the flowchart of FIGS. 4A–C, where block numbers correspond to program statement numbers in Listing 1. FIG. 4D shows how FIGS. 4A–C are to be connected. Those skilled in the art will recognize that the primary/-secondary table approach of the system of FIG. 3 has been used in Listings 1 and 2 and FIGS. 4A–C. The coding in Listing 1 is in the FORTRAN programming language as described, for example, in GE-600 Lines FORTRAN IV Reference Manual, General Electric Co., 1970, and the code in Listing 2 is in Honeywell 6000 assembly code language. both may be executed on the Honeywell series 6,000 machines. The above-mentioned assembly code and the general program using environment of the Honeywell 6,000 machine is described in GE-625/635 Programming Reference Manual, GE, 1969.

The typical allowed codewords for processing by Listings 1 and 2 when executed on a machine are those shown in Table IX. Listing 1 is seen to include as ITAB1 the primary table as as ITAB2 the secondary tables. The rightmost 2 octal digits in each of the table entries having exactly 3 significant octal digits identify the decoded symbols. In such cases, the third octal digit in each ITAB1 entry defines the codeword length. Thus, for example, on line 3 of ITAB1, the digits 421 in the word 000000000421 define a code of length 4 and decoded value 21. The entries in ITAB1 which have a fourth significant octal digit (in all cases a 1, signifying the need for a secondary table access) are those which specify a reference to the secondary tables. The rightmost 2 octal digits of such four-significant-digit words identify the appropriate one of the secondary tables in ITAB2, and the remaining significant digit specifies the number of additional bits to be retrieved from the input bit stream.

In ITAB2, the leftmost significant bit is the codeword length reduced by K, and the rightmost 2 digits define the decoded value. The leading zeroes in both ITAB1 and ITAB2 are of course of no significance; the table entries could therefore be packed more densely, e.g., into 10 bits each, if such savings are of consequence. The actual octal codes defining the output symbols are advantageously those for actuating standard printers or other such output or display devices.

While particular allowed codewords were assumed in the above examples and descriptions, the present invention is not limited in application to such particular codes. Any set fo Huffman minimum-redundancy codewords may be used with the present invention. In fact, many of the principles apply equally well to other variable-length codes which have the property that no codeword is the beginning of another codeword.

Further as should be clear from the discussion above of FIGS. 3, and 4A–C and Listings 1 and 2, the division of memory facilities between primary and secondary table storage neither implies the need for a single or a bifurcated memory; either configuration will suffice if it satisfies other system constraints.

LISTING 1

```
      DIMENSION IBUF(2),IN(68),ITAB1(32),ITAB2(38)
      DATA KUT/5/,IBLANK/020202020202/,
     1     ITAB1/000000000320,000000000320,000000000320,
     2           000000000320,000000000325,000000000325,
     3           000000000325,000000000325,000000000421,
     4           000000000421,000000000430,000000000430,
     5           000000000431,000000000431,000000000445,
     6           000000000445,000000000446,000000000446,
     7           000000000451,000000000451,000000000462,
     8           000000000462,000000000463,000000000463,
     9           000000000523,000000000524,000000000543,
     A           000000000564,000000001101,000000001103,
     B           000000001105,000000001507/
      DATA ITAB2/000000000122,000000000126,000000000127,
     1           000000000144,000000000147,000000000166,
     2           000000000170,000000000170,000000000170,
     3           000000000170,000000000170,000000000170,
     4           000000000170,000000000170,000000000170,
     5           000000000170,000000000170,000000000170,
     6           000000000170,000000000170,000000000170,
     7           000000000170,000000000265,000000000265,
     8           000000000265,000000000265,000000000265,
     9           000000000265,000000000265,000000000265,
     A           000000000342,000000000342,000000000342,
     B           000000000342,000000000541,000000000550,
     C           000000000567,000000000571/
    5 IPOINT=KUT
   10 READ 11,ICOUNT,IN
   11 FORMAT(I2,68I1)
   15 IF(ICOUNT.EQ.0) STOP
      DO 16 I=1,ICOUNT
   16 CALL JPUTB(IBUF,I+4,1,IN(I))
   20 IF(IPOINT.EQ.KUT) GO TO 40
```

LISTING 1 CONT.

```
      25 IF(ITAB.EQ.0) GO TO 40
         GO TO 115
      30 IF(ICOUNT.GE.IPOINT) GO TO 40
      35 ITAB=0
         GO TO 200
      40 IADR=JGETB(IBUF,IPOINT,KUT)+1
      45 ITAB=ITAB1(IADR)
      50 IF(ITAB.GT.511) GO TO 100
      55 IPOINT=IPOINT+(ITAB/64)
      60 CALL JPUTB(IBLANK,1,6,ITAB)
         PRINT 61,IBLANK
      61 FORMAT(1H ,A1)
      65 IF(IPOINT.LE.ICOUNT+KUT-1) GO TO 30
         GO TO 5
     100 IPOINT=IPOINT+KUT
     105 KUT2=(ITAB-512)/64
         IADR=MOD(ITAB,64)
     110 IF(ICOUNT+KUT-IPOINT.LT.KUT2) GO TO 200
     115 IADR=JGETB(IBUF,IPOINT,KUT2)+IADR
     120 ITAB=ITAB2(IADR)
         GO TO 55
     200 KUTL=ICOUNT+KUT-IPOINT
     205 CALL JPUTB(IBUF,5-KUTL,KUTL,JGETB(IBUF,IPOINT,KUTL))
     210 IPOINT=KUT-KUTL
         GO TO 10
         END
```

LISTING 2

```
$       GMAP                                                        BITPK
        TTL     BIT MANIPULATION PACKAGE - JGETB , JPUTB
        LBL     BITPK000
*
*
*               JGETB(FROM,I,N)         FORTRAN-CALLABLE FUNCTION
*
*       THIS FUNCTION RETURNS, RIGHT-ADJUSTED IN THE QR, N BITS
*       STARTING WITH THE I-TH BIT OF STRING FROM.
*
*
*               JPUTB(TO,I,N,FROM)      FORTRAN-CALLABLE SUBROUTINE
*
        THIS SUBROUTINE REPLACES BITS I THRU I+N-1 OF STRING TO
        WITH THE N RIGHT-MOST BITS OF WORD FROM.
*
*
*       I AND N ARE FULL-WORD INTEGERS, WHERE
*               I .GE. 1  AND
*               1 .LE. N .LE. 36
*
*       ON ANY ERROR, ZERO IS RETURNED FOR JGETB, AND THE STRING TO
*       IS UNCHANGED FOR JPUTB.
*
*
        SYMDEF  JGETB,JPUTB
*
*
JGETB   TSX0    J1
*
        LCX0    NBITS       X0 = -N
        XED     PLD         I-TH BIT IN BIT 0
        LRL     72,0        RT-JUSTIFY IN QR WITH LEADING ZEROS
        TRA     0,1         RETURN
*
FTEMP   OCT     0           PUT HERE TO PAD OUT LATER EVEN WORD-PAIR
*
JPUTB   TSX0    J1

        LCX0    NBITS       X0 = -N
        LDQ     5,1*        GET FROM
        QLS     36,0        LEFT-SHIFT 36-N BITS AND FILL WITH ZEROS
```

LISTING 2 CONT.

```
        QRL     36,0        RIGHT-ADJUST WITH LEADING ZEROS
        STQ     FTEMP
 PLD    ELDQ    **          ADDRESS OF 2ND WORD IF NEEDED, 1ST (NOP) IF NOT
        LLR     FBIT,I      I-TH BIT IN BIT 0 ("A" FLAG IS OK)
NBITS   LLS     **          BRING IN N BITS OF ZEROS
        ORQ     FTEMP       INSERT NEW N BITS
        SBX0    FBIT        -N - I + 1
        LLR     72,0        ROTATE 72-N-I+1
        STQ     PLD,I       ADDRESS OF 2ND WORD IF NEEDED, 1ST (NOP) IF NOT
        STA     LD1,I       NEW TO
        TRA     0,1         RETURN
*
 J1     STX1    .E.L..      COMMON PART OF PUT AND GET--SAVE ERROR LINKAGE
        LDQ     3,1*        GET I
        SBQ     1,DL
        TMI     ERR
        DIV     36,DL
        EAA     0,AL        AU = I-1 (0.LE.I-1.LE.35)
        STCA    FBIT,70     SAVE I-1
        EAA     2,1*            GET STRING WORD ADDRESS                      SSS
        STCA    *+1,70          INIT NEXT INSTR. WITH IT.                    SSS
        EAQ     **,QL           ADD STRING WORD ADDRESS                      SSS
        STCQ    LD1,70      SET UP ADDRESS OF 1ST WORD
        LDA     4,1*        GET NBITS
        TMI     ERR         N = 0 WILL BE HANDLED PROPERLY
        EAA     0,AL        AU = N
        STCA    NBITS,70    SAVE N
        SBA     37,DU       CHECK N = 0 THRU 36

        TPL     ERR
 FBIT   ADA     **,DU       SEE WHETHER ONE OR TWO WORDS NEEDED FOR SHIFTS
        TMI     *+2         NEED ONLY 1 WORD (N-37 + I-1 .LT. 0)
        ADLQ    1,DU        PREPARE SETUP FOR USE OF 2 SUCCESSIVE WORDS
        STCQ    PLD,70      SET UP ADDRESS OF 1ST OR 2ND WORD
LD1     LDA     **          GET FROM (JGETB) OR TO (JPUTB)--1ST WORD
        TRA     0,0         RETURN TO PUT OR GET
*
 ERR    LDQ     0,DL        ERROR IN CALLING SEQUENCE
        TRA     0,1         RETURN
        END
```

What is claimed is:

1. Apparatus for decoding an ordered sequence of variable-length input binary codewords each associated with a symbol in an N-symbol output alphabet comprising A. a memory storing a first plurality of words each storing information relating to an output symbol, B. means for selecting a fixed-length K-bit sample, $K \geq 2$, from said input sequence, C. means for deriving address signals based on said sample of bits, and D. means for reading information from the location in said memory specified by said address.

2. Apparatus according to claim 1 wherein said memory also contains in each of said words information relating to the length of the input codeword corresponding to each of said output symbols, said apparatus further comprising means responsive to said information related to said codeword length for identifying the first bit in the following codeword in said input sequence.

3. Apparatus according to claim 2 wherein said memory is a memory storing in said first plurality of words information explicity identifying a symbol in said output alphabet.

4. Apparatus according to claim 1 wherein said memory is a memory also storing a plurality of secondary tables, each secondary table comprising words explicitly identifying a symbol in said output alphabet, said memory also storing, in a first subset of said first plurality of words, information identifying one of said plurality of second tables.

5. Apparatus according to claim 4 wherein said memory also stores in each of said words in said secondary tables information identifying $L_i$–K, where $L_i$, i = 1,2, . . . , M, is the length of the codeword associated with the ith of said output symbols.

6. Apparatus according to claim 5 further comprising means responsive to said information identifying $L_i$–*K* for identifying the first bit in the immediately following codeword in said input sequence.

7. Apparatus according to claim 4 wherein said memory is a memory also storing in each of said first plurality of words signals indicating an additional number, A, of bits in said input stream, means responsive to said signals for accessing the immediately succeeding A bits in said input stream, means responsive to said A bits and to said information identifying said one of said tables for accessing one of said words in said one of said tables.

8. Apparatus according to claim 4 wherein said memory is a memory storing in a second subset of said first plurality of words information explicity identifying a symbol in said output alphabet.

9. Apparatus according to claim 8 wherein said memory stores, for each output symbol explicity identified, an indication of the length of the associated input codeword.

* * * * *